US006738254B2

United States Patent
Oogami

(12) United States Patent
(10) Patent No.: US 6,738,254 B2
(45) Date of Patent: May 18, 2004

(54) ELECTRONIC APPARATUS

(75) Inventor: Keizo Oogami, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 241 days.

(21) Appl. No.: 09/949,661

(22) Filed: Sep. 12, 2001

(65) Prior Publication Data

US 2002/0036888 A1 Mar. 28, 2002

(30) Foreign Application Priority Data

Sep. 13, 2000 (JP) ...................................... 2000-278698

(51) Int. Cl.[7] .................................................. G06F 1/16
(52) U.S. Cl. ....................... 361/680; 361/682; 361/686; 361/724; 361/137; 361/138
(58) Field of Search ........................... 361/1, 683, 684, 361/687, 800, 816, 680, 818, 679, 682, 686, 670, 624, 627, 767, 789, 137, 138

(56) References Cited

U.S. PATENT DOCUMENTS

| 5,355,278 A | * | 10/1994 | Hosoi et al. | ................ | 361/680 |
| 5,731,952 A | * | 3/1998 | Ohgami et al. | ............. | 361/687 |
| 6,101,089 A | * | 8/2000 | Seto et al. | .................. | 361/687 |
| 6,241,007 B1 | * | 6/2001 | Kitahara et al. | ........... | 165/80.4 |

FOREIGN PATENT DOCUMENTS

| JP | 10-50910 | 2/1998 |
| JP | 11-87956 | 3/1999 |
| TW | 319407 | 11/1997 |
| TW | 325901 | 1/1998 |
| TW | 444899 | 7/2001 |

OTHER PUBLICATIONS

Japanese Office Action (mailing date of Jun. 24, 2003) citing above–listed documents, as well as an English Translation of the Japanese Office Action.
Taiwanese Office Action (mailing date of May 16, 2003) citing TW 319407, 325901 and TW 444899 as well as an English Translation of the Taiwanese Office Action.

* cited by examiner

Primary Examiner—Anthony Dinkins
Assistant Examiner—Nguyen T. Ha
(74) Attorney, Agent, or Firm—Finnegan, Henderson, Farabow, Garrett & Dunner, L.L.P.

(57) ABSTRACT

An apparatus body of a personal computer is provided with a cooling unit configured to cool the interior of the apparatus body. The cooling unit includes a cooling duct located between a printed circuit board and a top wall of the apparatus body and a support mechanism supporting and elastically pressing the cooling duct against at least one of the electronic components on the circuit board. A support post portion of the support mechanism is set up on the bottom wall of the apparatus body or the printed circuit board and extends toward the top wall through the cooling duct. The top wall of the apparatus body includes an abutting portion abutting against an end portion of the support post portion to prevent the top wall from being deformed.

10 Claims, 5 Drawing Sheets

ELECTRONIC APPARATUS

CROSS-REFERENCE TO RELATED APPLICATIONS

This application is based upon and claims the benefit of priority from the prior Japanese Patent Application No. 2000-278698, filed Sep. 13, 2000, the entire contents of which are incorporated herein by reference.

BACKGROUND OF THE INVENTION

1. Field of the Invention

The present invention relates to an electronic apparatus such as a portable personal computer, and more particularly, to an electronic apparatus provided with a cooling unit for cooling electronic components.

2. Description of the Related Art

Recently, compact portable computers such as notebook-type personal computers, so-called mobile computers, etc have gained popularity. The computers of these types have been reduced in body size to be improved in portability, and nevertheless, require higher performance and multifunctional properties.

In general, one such computer comprises a substantially rectangular flat apparatus body and a display unit rockably mounted on the apparatus body. The apparatus body contains therein a printed circuit board, which is mounted with a lot of electronic components, and a hard disc drive, floppy disc drive, optical disc drive, etc. for use as information storage devices. In order to miniaturize the computer, these components are arranged in the apparatus body with high packaging density. A CPU, among other electronic components that are arranged in the apparatus body, is highly improved in performance, and releases a lot of heat.

Accordingly, the computer of this type is provided with a cooling unit for cooling the interior of the apparatus body, especially the CPU. The cooling unit includes a duct formed of a highly radiative metal such as aluminum and an air fan in the duct. The duct is provided in the apparatus body in a manner such that it is partially in contact with the CPU, and its discharge port communicates with exhaust holes that are formed in the apparatus body. Heat transmitted from the CPU to the duct is discharged into cooling air that flows in the duct, whereby the CPU and the interior of the apparatus body are cooled.

According to this cooling unit, moreover, the duct is supported and elastically pressed against the CPU by means of a floating structure so that the CPU can be cooled securely.

Normally, the cooling unit of the computer located on the bottom wall of the apparatus body and opposed to the top wall of the apparatus body. A keyboard and the like are provided on the top wall. If the duct of the cooling unit is supported by means of the floating structure, a given gap must be kept between the duct and the top wall of the apparatus body.

If an external force acts on the apparatus body or when the keyboard is operated, the top wall may possibly be deformed and touch the duct. Conventionally, therefore, deformation of the top wall of the apparatus body is prevented to maintain the gap between the top wall and the duct by means of a reinforcing member such as sheet metal that is located inside the top wall.

If the reinforcing member is thus used to prevent deformation of the top wall of the apparatus body, however, the overall thickness of the apparatus body is too great for the miniaturization of the personal computer.

BRIEF SUMMARY OF THE INVENTION

The present invention has been contrived in consideration of these circumstances, and its object is to provide an electronic apparatus of which the body can be thinned and prevented from being deformed.

According to an aspect of the present invention, there is provided an electronic apparatus comprising; an apparatus body having a bottom wall and a top wall opposed to the bottom wall; a circuit board located on the bottom wall of the apparatus body and mounted with electronic components; and a cooling unit located in the apparatus body and configured to cool the interior of the apparatus body. The cooling unit includes a cooling duct located between the circuit board and the top wall of the apparatus body and a support mechanism supporting and elastically pressing the cooling duct against at least one of the electronic components on the circuit board. The support mechanism includes a support post portion set up on the bottom wall of the apparatus body or the circuit board and extending toward the top wall through the duct. The top wall of the apparatus body includes an abutting portion abutting against an end portion of the support post portion to prevent the top wall from being deformed.

The abutting portion may be a protrusion that is molded integrally with the top wall or formed by partially deforming the top wall, and may be designed to be screwed to the support post portion.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Portable personal computers according to embodiments of the invention will now be described with reference to the accompanying drawings.

Figure 1:
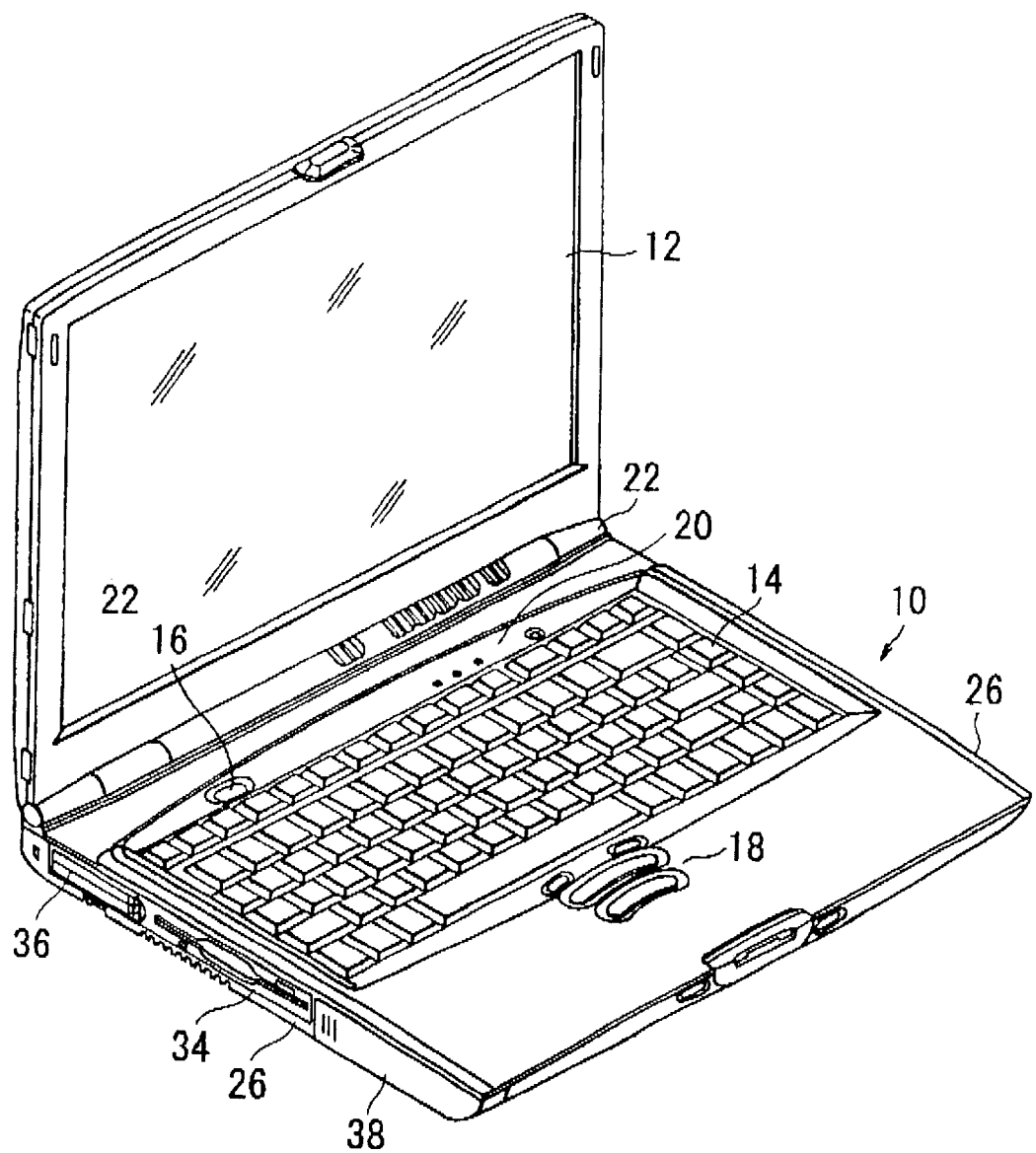
FIG. 1 is a perspective view showing a personal computer according to an embodiment of the present invention.
Figure 2:
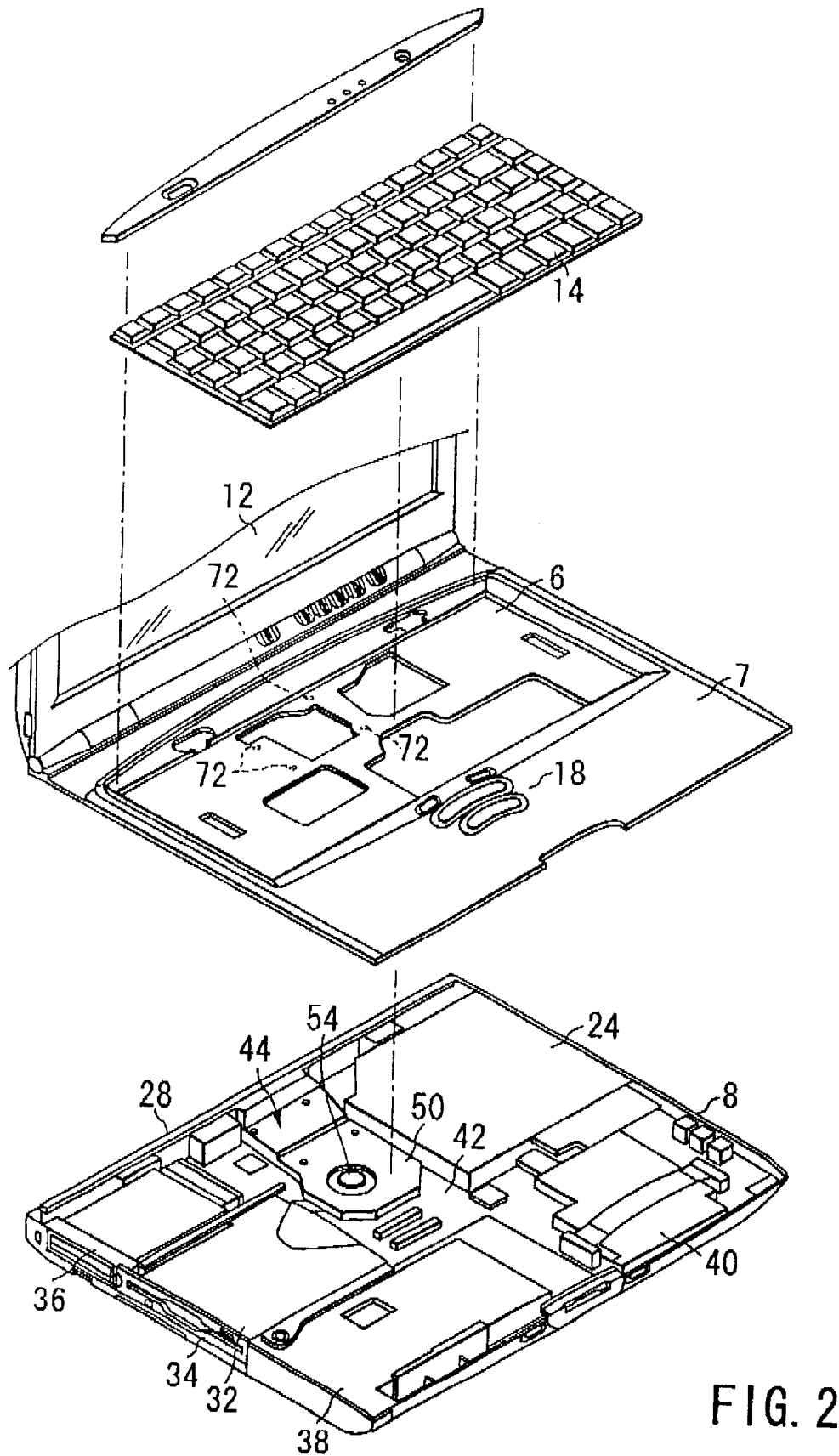
FIG. 2 is an exploded perspective view showing the personal computer.

As shown in FIGS. 1 and 2, a personal computer comprises an apparatus body 10 in the form of a flat rectangular box and a flat rectangular display unit 12.

The apparatus body 10 is composed of a rectangular base portion 8 having a top opening and a cover 7 fitted to the base portion so as to cover the opening of the base portion. The apparatus body 10 includes a top wall formed of the cover 7, a pair of sidewalls 26, a rear wall 28, and a rectangular bottom wall 25.

The top wall of the apparatus body 10 is formed having a rectangular recess 6, which contains a keyboard 14 having a large number of keys 5. Further, a power switch 16, click switches 18, indicators 20, etc. are arranged on the top wall of the apparatus body 10. The display unit 12 is supported by means of hinge portions 22 on the rear part of the apparatus body 10 for a rocking motion between an open position (shown in FIG. 1) in which the keyboard 14 can be operated and a closed position in which the display unit 12 covers the keyboard.

Arranged in the apparatus body 10, moreover, are an optical disc drive 24, floppy disc drive 32, card loading portion 36, battery pack 38, and various other electronic components. A printed circuit board 42, which is mounted with electronic components, is located on the bottom wall 25 in the apparatus body 10, and a cooling unit 44 for cooling the interior of the apparatus body 10 and the electronic components is located on the circuit board 42.

Figure 3:
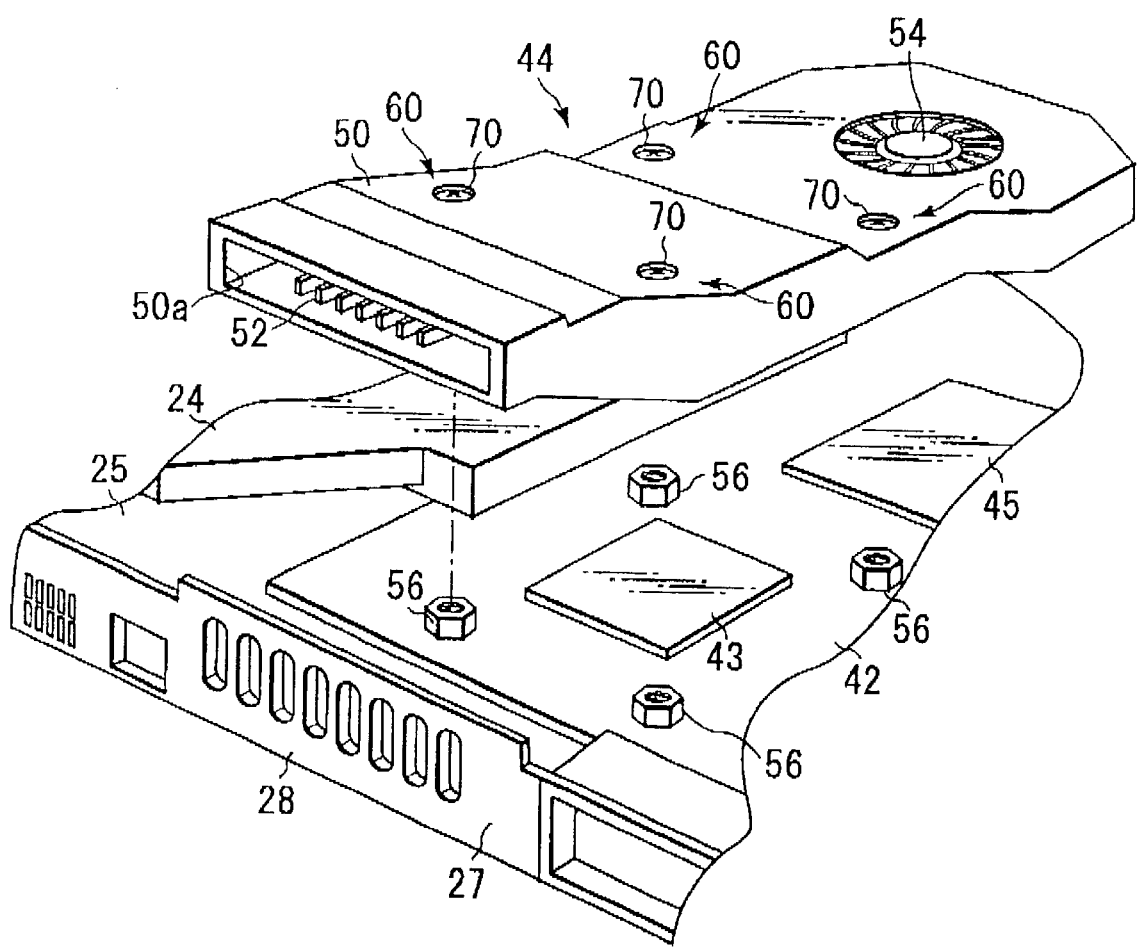
FIG. 3 is an exploded perspective view showing a cooling unit portion in the personal computer.
Figure 4:
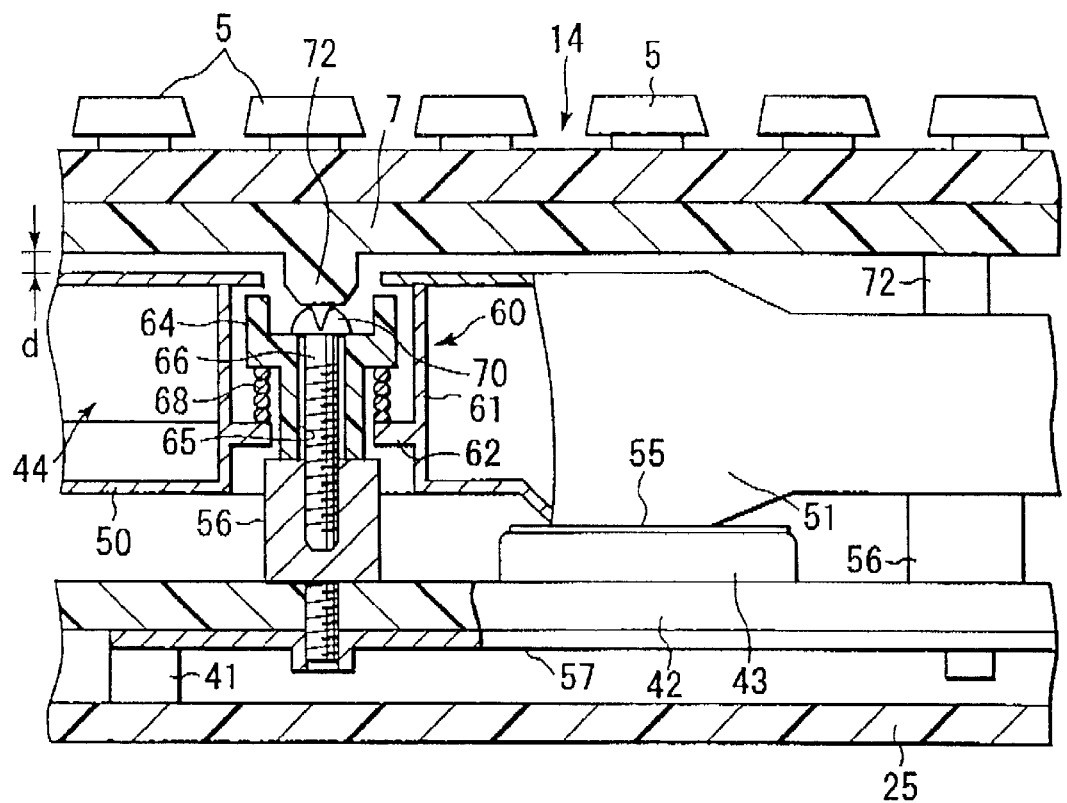
FIG. 4 is a cutaway side view showing the cooling unit portion in the personal computer.

AS shown in FIGS. 2 to 4, the cooling unit 44 is provided with a cooling duct 50 of aluminum or some other metal having a rectangular cross section and a fan 54 in the cooling duct. The cooling duct 50 is supported on the printed circuit board 42 by means of a support mechanism that includes four support post portions 60, and is situated under the keyboard 14. A discharge port 50a that is formed in one end of the cooling duct 50 communicates with discharge holes 27 that are formed in a rear wall 28 of the apparatus body 10. The fan 54 is located in the other end portion of the cooling duct 50 and opposed to a circular suction port 53 in the duct 50. A large number of radiator fins 52 are formed in the cooling duct 50.

The printed circuit board 42 is located on bosses 41 that are formed on the inner surface of the bottom wall 25 of the apparatus body 10. A lining plate 57 is fixed to at least a part of the undersurface of the circuit board 42. Mounted on the printed circuit board 42, moreover, are a CPU 43, a semiconductor package 45, and many other electronic components (not shown).

The cooling duct 50 is put on the CPU 43 and the semiconductor package 45. The duct 50 has a partially projecting contact portion 51 that is in contact with the CPU 43 with a cooling sheet 55 between them.

The four support post portions 60, which have a floating structure each, are arranged around the CPU 43. Thus, the cooling duct 50 is supported by means of the support post portions 60 in a manner such that the contact portion 51 is elastically pressed against the CPU 43.

As shown in FIGS. 3 and 4, each support post portion 60 is provided with a hexagonal stud 56, cylindrical retaining member 64, fixing screw 66, and compression coil spring 68. The hexagonal stud 56 is screwed in the printed circuit board 42 and projects upward from the circuit board 42. The retaining member 64 is located substantially coaxially on the stud 56. The fixing screw 66 is screwed into a tapped hole of the stud 56 through a bore 65 of the retaining member 64, thereby fixing the retaining member on the stud 56. The spring 68, which is located around the retaining member 64, urges the cooling duct 50 toward the CPU 43. The support post portions 60 are set up vertically on the printed circuit board 42.

The retaining member is not limited to a cylindrical shape, and may be formed integrally with the fixing screw 66 and/or the stud 56.

The cooling duct 50 includes four partition sleeves 61, whereby it is divided inside, and is formed having a through hole that penetrates the duct 50 at right angles thereto. The four support post portions 60 are inserted individually into the sleeves 61 of the duct 50. A ring-shaped spring bearing rib 62 is formed on the inner surface of each sleeve 61, and the compression coil spring 68 of each support post portion 60 is interposed between the spring bearing 62 and a shoulder portion of the retaining member 64.

Thus, the cooling duct 50 is elastically supported by means of the four support post portions 60 and pressed against the CPU 43 by means of the compression coil springs 68. In this state, the top surface of the duct 50 faces the inner surface of the cover 7 of the apparatus body 10 with a given gap d between them.

As shown in FIGS. 2 and 4, on the other hand, four support protrusions 72 are molded integrally with that portion of the cover 7 which faces the cooling duct 50, and project toward the duct 50. Each support protrusion 72, which constitutes an abutting portion of an aspect of the present invention, projects into its corresponding partition sleeve 61 through the upper end of the sleeve, and abuts against a head portion 70 of the fixing screw 66 that constitutes each support post portion 60.

In this manner, that portion of the cover 7 which faces the cooling duct 50 is supported on the bottom wall 25 of the apparatus body 10 by means of the support protrusions 72, support post portions 60, and printed circuit board 42. Thus, the cover 7 can be prevented from being deformed or distorted under external pressure, and the gap d between the inner surface of the cover 7 and the top surface of the cooling duct 50 can always be kept at the given value.

According to the personal computer constructed in this manner, the support protrusions 72 are provided on the top wall of the apparatus body 10 or the cover 7 and are caused to abut individually against the respective upper end portions of their corresponding support post portions 60, so that the cover 7 can be supported by means of the support protrusions 72, support post portions 60, and printed circuit board 42. Thus, the cover 7 can be prevented from being deformed or distorted under external pressure, and the gap d between the inner surface of the cover 7 and the top surface of the cooling duct 50 can always be kept at the given value.

Since the cover 7 is supported by means of the support protrusions 72 and the support post portions 60, moreover, it is unnecessary to provide a separate reinforcing member such as sheet metal between the cooling unit 44 and the cover 7. Thus, the number of necessary components can be lessened, and the apparatus body 10 can be reduced in size and thickness.

Figure 5:
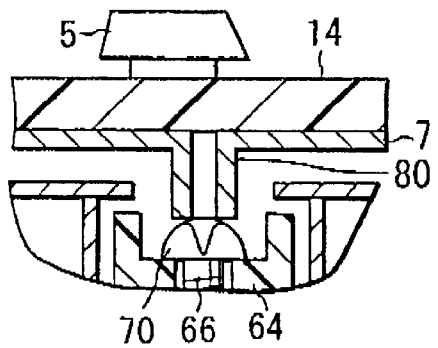
FIG. 5 is a sectional view showing a first modification of an abutting portion formed on a cover in the personal computer.
Figure 6:
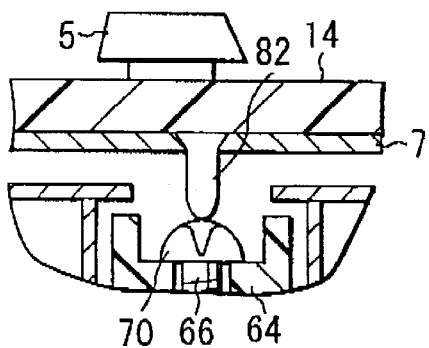
FIG. 6 is a sectional view showing a second modification of the abutting portion formed on the cover in the personal computer.

According to the embodiment described above, the cover 7 of the apparatus body 10 is formed of a synthetic resin, and each support protrusion 72 is molded integrally with the cover. If the cover 7 is formed of a metallic plate, for example, however, each support protrusion 80 may be formed by burring a part of the cover, as shown in FIG. 5. Alternatively, each support protrusion may be formed of a caulked pin 82 that is driven into the cover 7, as shown in FIG. 6.

Figure 7:
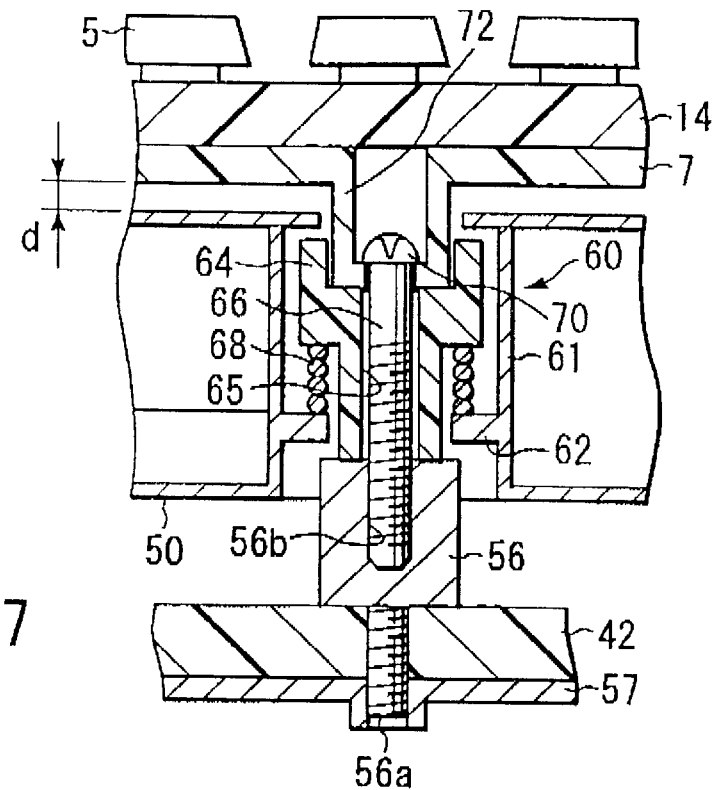
FIG. 7 is a sectional view showing a support post portion of a cooling unit and an abutting portion of a cover in a personal computer according to a second embodiment of the invention.
Figure 8:
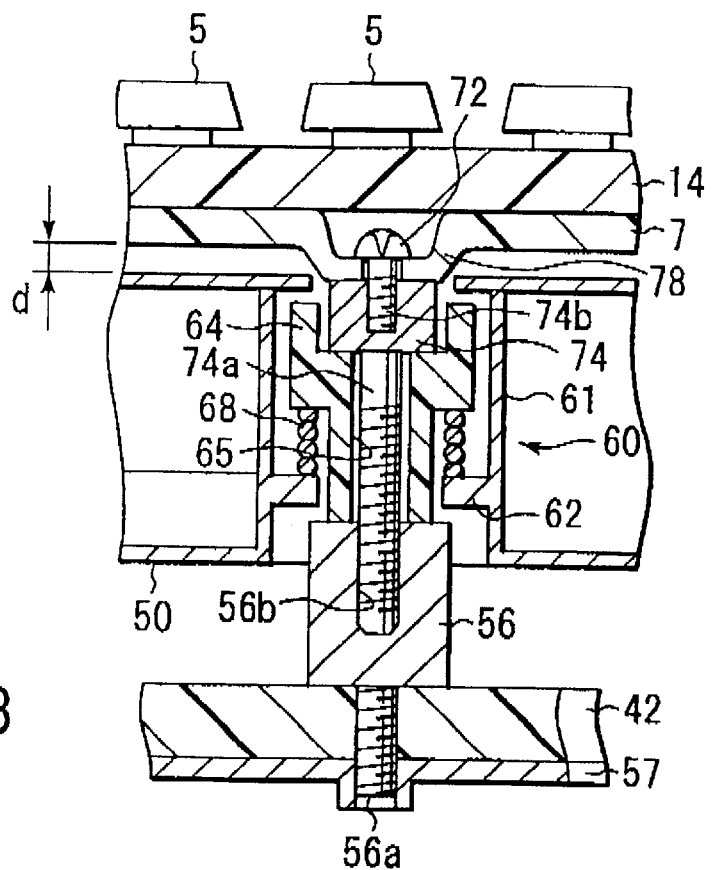
FIG. 8 is a sectional view showing a support post portion of a cooling unit and an abutting portion of a cover in a personal computer according to a third embodiment of the invention.

The following is a description of a personal computer according to a second embodiment of the invention. According to the second embodiment, as shown in FIG. 7, each support post portion 60 is provided with a hexagonal stud 56, cylindrical retaining member 64, fixing screw 66, and compression coil spring 68. The hexagonal stud 56 has a screw portion 56a that is screwed in a printed circuit board 42 and projects from the circuit board 42. The retaining member 64 is located substantially coaxially on the stud 56. The fixing screw 66 is screwed into a tapped hole 56b of the stud 56 through the retaining member 64, thereby fixing the retaining member on the stud 56. The spring 68, which is located around the retaining member 64, urges a cooling duct 50 toward a CPU.

Further, hollow protrusions 72 for use as abutting portions protrude integrally from that portion of a cover 7 which faces the cooling duct 50 toward the cooling duct. The projecting end of each protrusion 72 projects into its corresponding partition sleeve 61 through the upper end of the sleeve and abuts against the retaining member 64. Furthermore, the fixing screw 66 of each support post portion 60 is screwed into the hexagonal stud 56 through an aperture in the bottom portion of the protrusion 72, thereby fixing the protrusion to the retaining member 64.

In this manner, that portion of the cover 7 which faces the cooling duct 50 is supported on a bottom wall of an apparatus body 10 by means of the protrusions 72, support post portions 60, and printed circuit board 42. Thus, the cover 7 can be prevented from being deformed or distorted under external pressure, and a gap d between the inner surface of the cover 7 and the top surface of the cooling duct 50 can always be kept at a given value.

According to a third embodiment of the invention, as shown in FIG., 8, each support post portion 60 is provided with a first hexagonal stud 56, cylindrical retaining member 64, second hexagonal stud 74, and compression coil spring 68. The first hexagonal stud 56 has a screw portion 56a that is screwed in a printed circuit board 42 and projects from the circuit board 42. The retaining member 64 is located substantially coaxially on the first stud 56. The second stud 74 has a screw portion 74a that is screwed into a tapped hole 56b of the first stud 56 through the retaining member 64, thereby fixing the retaining member on the first stud 56. The spring 68, which is located around the retaining member 64, urges a cooling duct 50 toward a CPU.

Further, hollow protrusions 78 for use as abutting portions protrude integrally from that portion of a cover 7 which faces the cooling duct 50 toward the cooling duct. The projecting end of each protrusion 78 abuts against the second hexagonal stud 74 of its corresponding support post portion 60. Furthermore, each protrusion 78 is fixed to the second stud 74 by means of a fixing screw 76 that is screwed into a tapped hole 74b of the stud 74 through an aperture in the bottom wall of the protrusion 78.

In this manner, that portion of the cover 7 which faces the cooling duct 50 is supported on a bottom wall of an apparatus body 10 by means of the protrusions 78, support post portions 60, and printed circuit board 42. Thus, the cover 7 can be prevented from being deformed or distorted under external pressure, and a gap d between the inner surface of the cover 7 and the top surface of the cooling duct 50 can always be kept at a given value.

Also in the second and third embodiments constructed in this manner, the protrusions 72 or 78 are provided on the top wall of the apparatus body 10 or the cover 7 and are caused to abut individually against the respective upper end portions of their corresponding support post portions 60, so that the same functions and effects of the first embodiment can be obtained. According to the second and third embodiment, moreover, the protrusions 72 or 78 on the cover 7 are screwed individually to the support post portions 60, so that the cover 7 can be supported more securely without looseness.

The second and third embodiments share other configurations with the first embodiment. In the description of these embodiments, therefore, like reference numerals are used to designate like portions, and a detailed description of those portions is not repeated.

It is to be understood, moreover, that the present invention is not limited to the embodiments described above, and that various changes and modifications may be effected therein by one skilled in the art without departing from the scope or spirit of the invention. For example, the support post portions may be set up on the bottom wall of the apparatus body in place of the printed circuit board. The respective specific configurations of the abutting portions and the support post portions are not limited to the ones according to the embodiments described herein, and may be variously changed as required. If necessary, moreover, the numbers of support post portions and abutting portions may be increased or reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
    an apparatus body having a bottom wall and a top wall opposed to the bottom wall;
    a circuit board located on the bottom wall of the apparatus body and mounted with electronic components; and
    a cooling unit located in the apparatus body and configured to cool the interior of the apparatus body,
    the cooling unit including a cooling duct located between the circuit board and the top wall of the apparatus body and a support mechanism supporting and elastically pressing the cooling duct against at least one of the electronic components on the circuit board,
    the support mechanism including a support post portion set up on the bottom wall of the apparatus body or the circuit board and extending toward the top wall through the duct,
    the top wall of the apparatus body including an abutting portion abutting against an end portion of the support post portion to prevent the top wall from being deformed.

2. An electronic apparatus according to claim 1, wherein the support post portion includes a stud screwed in the bottom wall of the apparatus body or the circuit board and projecting toward the top wall, a retaining member arranged on the stud, a fixing screw screwed into the stud through the retaining member to fix the retaining member on the stud, and an urging member located around the retaining member and urging the duct toward the electronic component, and the abutting portion includes a support protrusion protruding from the top wall toward the duct and abutting against the fixing screw.

3. An electronic apparatus according to claim 2, wherein the top wall is formed of a synthetic resin, and the support protrusion is molded integrally with the top wall.

4. An electronic apparatus according to claim 2, wherein the top wall is formed of a metallic plate, and the support protrusion is formed by burring a part of the top wall.

5. An electronic apparatus according to claim 2, wherein the top wall is formed of a metallic plate, and the support protrusion is formed of a pin driven in the top wall.

6. An electronic apparatus according to claim 1, wherein the support post portion includes a stud screwed in the bottom wall of the apparatus body or the circuit board and projecting toward the top wall, a retaining member located on the stud, a fixing screw fixing the retaining member on the stud, and an urging member located around the retaining member and urging the duct toward the electronic component, and the abutting portion includes a hollow protrusion protruding from the top wall toward the duct and abutting against the retaining member, the fixing screw of the support post portion being screwed into the stud through the protrusion and fixing the protrusion to the retaining member.

7. An electronic apparatus according to claim 1, wherein the support post portion includes a first stud screwed in the bottom wall of the apparatus body or the circuit board and projecting toward the top wall, a cylindrical retaining member located substantially coaxially on the first stud, a second stud screwed into the first stud through the retaining member, thereby fixing the retaining member on the first stud, and an urging member located around the retaining member and urging the duct toward the electronic component, and the abutting portion includes a hollow protrusion protruding from the top wall toward the duct and abutting against the second stud, the protrusion being fixed to the second stud by means of a screw screwed into the second stud through the protrusion.

8. An electronic apparatus according to claim 1, wherein the support mechanism includes a plurality of the support post portions surrounding at least one of the electronic components.

9. An electronic apparatus according to claim 1, wherein the cooling duct includes one end portion situated opposite a discharge hole formed in the apparatus body, the other end portion stored with a fan, and a contact portion situated between the one end portion and the other end portion and in contact with the electronic component.

10. An electronic apparatus according to claim 1, wherein the apparatus body is provided with a keyboard located on the top wall, and the abutting portion is located under the keyboard.

* * * * *